Figure 1:
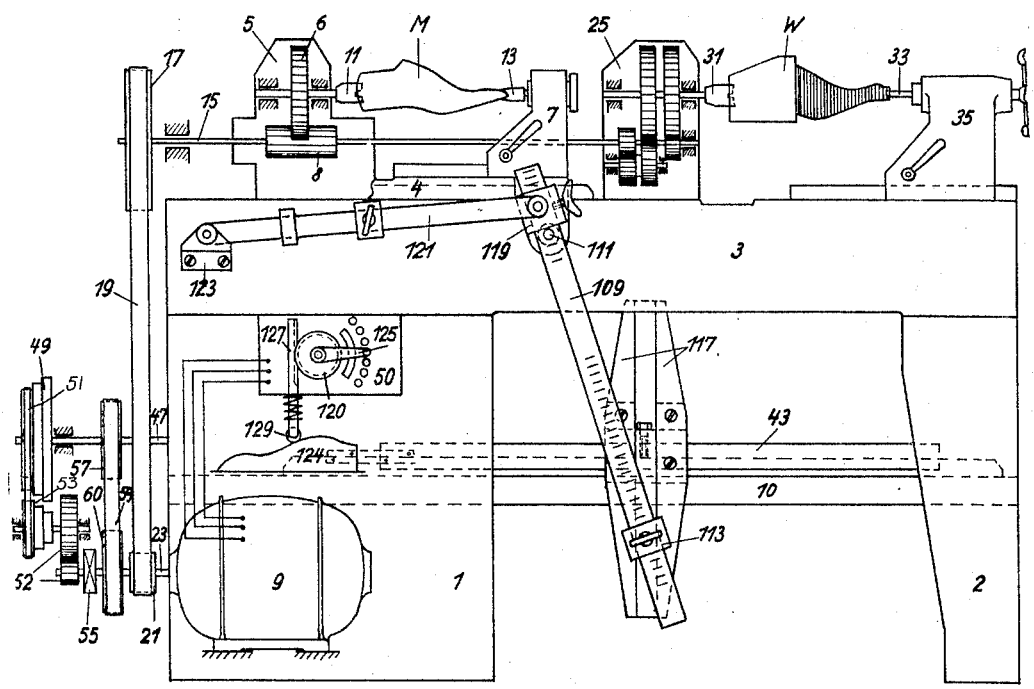

March 31, 1931. C. BLACK ET AL 1,798,926
MACHINE FOR COPYING SHOE LASTS AND OTHER IRREGULAR ARTICLES
Filed March 30, 1928 7 Sheets-Sheet 1

CARL BLACK
CARL BENSCHEIDT JR.,
INVENTORS

March 31, 1931.  C. BLACK ET AL  1,798,926
MACHINE FOR COPYING SHOE LASTS AND OTHER IRREGULAR ARTICLES
Filed March 30, 1928  7 Sheets-Sheet 2

CARL BLACK
CARL BENSCHEIDT JR.,
INVENTORS
By Otto Munk
their Attorney.

March 31, 1931. C. BLACK ET AL 1,798,926
MACHINE FOR COPYING SHOE LASTS AND OTHER IRREGULAR ARTICLES
Filed March 30, 1928 7 Sheets-Sheet 3

CARL BLACK
CARL BENSCHEIDT JR.
INVENTORS

March 31, 1931. C. BLACK ET AL 1,798,926
MACHINE FOR COPYING SHOE LASTS AND OTHER IRREGULAR ARTICLES
Filed March 30, 1928 7 Sheets-Sheet 6

CARL BLACK
CARL BENSCHEIDT JR.,
INVENTORS
By Otto Munk
their Attorney.

March 31, 1931.   C. BLACK ET AL   1,798,926
MACHINE FOR COPYING SHOE LASTS AND OTHER IRREGULAR ARTICLES
Filed March 30, 1928   7 Sheets-Sheet 7

CARL BLACK
CARL BENSCHEIDT JR
INVENTORS
By
their Attorney.

Patented Mar. 31, 1931

1,798,926

UNITED STATES PATENT OFFICE

CARL BLACK AND CARL BENSCHEIDT, JR., OF ALFELD-ON-THE-LEINE, GERMANY

MACHINE FOR COPYING SHOE LASTS AND OTHER IRREGULAR ARTICLES

Application filed March 30, 1928, Serial No. 266,034, and in Germany April 7, 1927.

Our invention relates to an improved machine for copying shoe lasts and other irregular articles.

In the usual copying benches for copying shoe lasts and other irregularly shaped articles a rocking or oscillating frame is usually employed in which the pattern or model and the work are rotatably supported. The feeler wheel in contact with the pattern and the cutter head operating on the block to be shaped are mounted in slides adapted to be moved longitudinally. The position of the pattern in relation to the cutter head and thus to the size of the last to be produced is determined by the pattern touching the feeler wheel and when a change of the operative radius occurs the supporting frame, describes an arc. In this way certain distortions or deformations occur in the reproduction of the pattern, particularly when, due to the usually provided grading devices, the size of the work differs considerably from the pattern, or when a piece of work shaped symmetrically to the pattern is produced and the direction of rotation of the pattern is opposite to that of the work. It has already been attempted to eliminate these drawbacks by supporting the pattern and the block in separate slides, so that they perform a rectilinear motion. This mechanism, however, is comparatively heavy and cumbersome.

It has also been proposed to arrange the feeler and the cutter head to slide rectilinearly or in a straight line in the direction towards the work and away from it, but here also the customary dovetailed guides have been used which cause considerable friction, so that the feeler is not able to drop quickly enough into recesses of the pattern unless very great forces are employed for keeping the parts in contact, which forces have a detrimental action upon the pattern and render the motion of the feeler in the reverse direction difficult.

According to our invention the above recited drawbacks are effectively eliminated by effecting the straight-line guidance of the feeler wheel and the cutter head by a guide link motion. The pivots of such a guide link motion offer so little friction, that the working speed may be considerably increased, while the product manufactured on the bench is greatly improved. The advantages of the guidance in a straight line instead of in an arc as regards the avoidance of distortions in the finished last are maintained.

Figure 2:
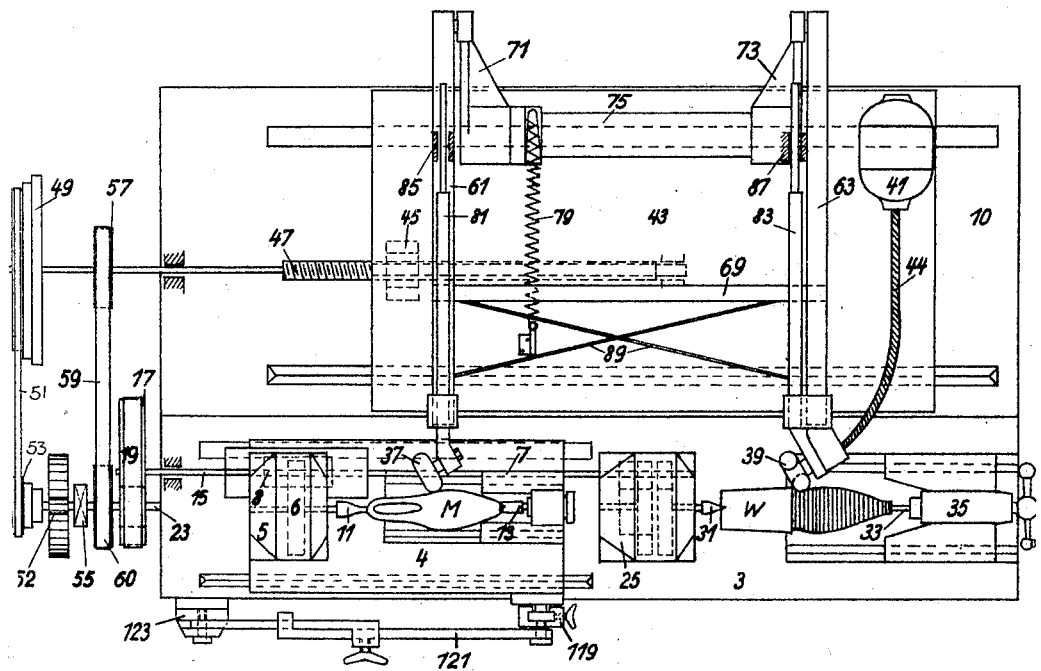
Figure 3:
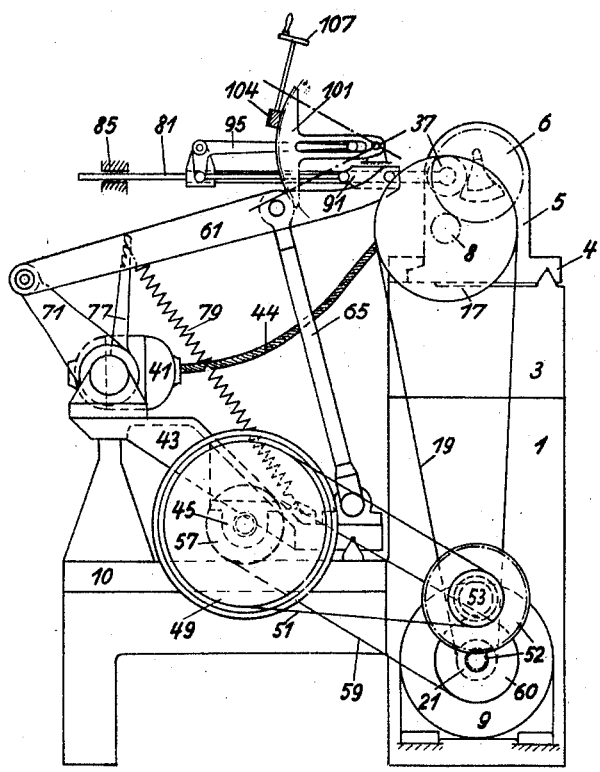
Figure 4:
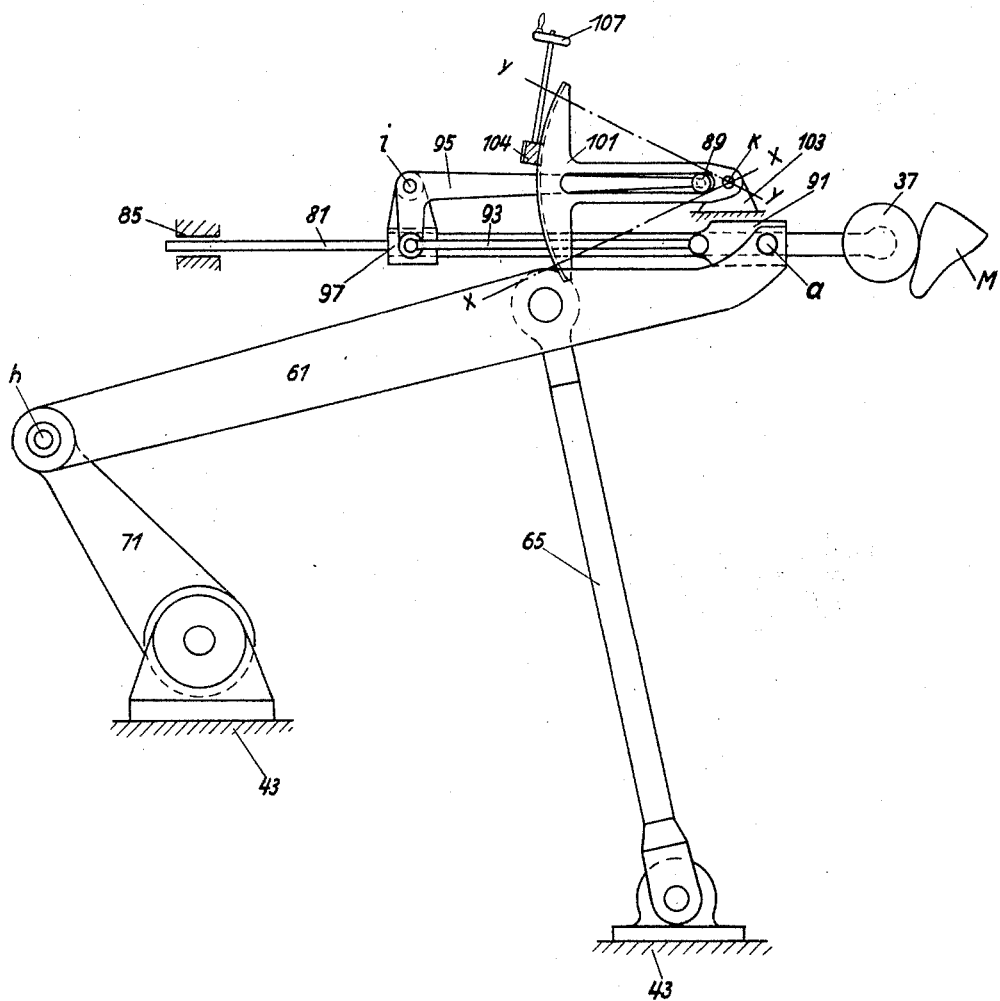
Figure 5:
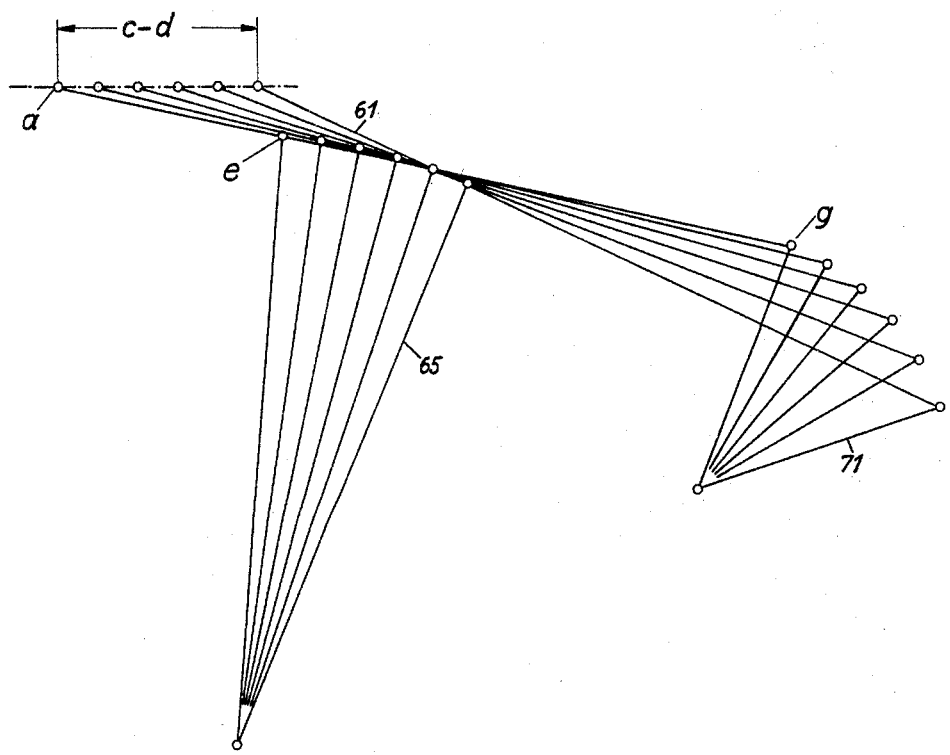
Figure 6:
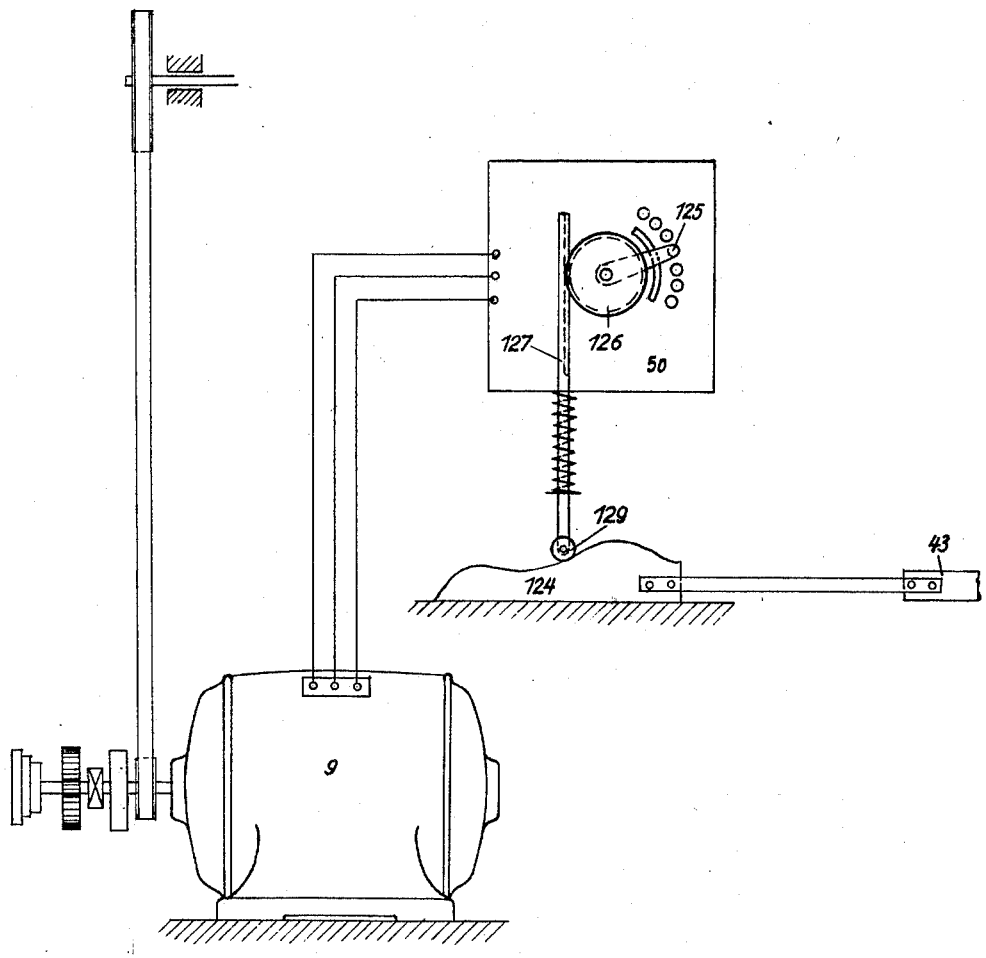

The invention is illustratively exemplified in the accompanying drawings in which Figure 1 is a front elevation of the machine; Figure 2 a plan view; Figure 3 a side elevation; Figure 4 a section on an enlarged scale of the means for width grading; Figure 5 a schematic view of the lever guide; Figure 6 an assembled view on an enlarged scale of means for changing the speed of the machine; and Figure 7 a perspective of the lever guide.

The machine frame comprises legs 1 and 2 supporting two tables or beds 3 and 10. The left leg 1 is formed as a housing for an electric motor 9, with which the usual starting and stopping mechanism, and a regulating device hereinafter more fully described, are associated.

Reciprocable at the left side of the bed 3 is a carriage 4 supporting a gear box 5 adapted to receive a speed reducing gear with two gear wheels 6 and 8 and a movable head 7 adapted to be secured in adjusted position. The gear 5 is provided with a dog 11 and the head 7 with a bearing point 13 which is longitudinally displaceable in the head 7. M is the pattern which is secured between dog 11 and bearing point 13, the pattern being rotated by rotation of the dog. The driving shaft 15 for the gear drive is rotated from the shaft 23 of the electric motor 9 by means of pulley 17, belt 19 and pulley 21. The gear wheel 8 has the form of a wide roll so that the engagement between the gears 6 and 8 is not disturbed when the carriage 4 which carries the gear box 5 reciprocates. As hereinafter described, a displacement of the carriage occurs when a difference between the length of the pattern and that of the last made according thereto, is caused by the length grading mechanism.

Arranged at the right side of the bed 3 is the means for securing the work or wood block W, such means comprising a gear box 25 containing the usual reducing and reversing gear. This gear effects rotation of the dog 31. The direction of rotation may be reversed so that a like or reverse copy may be produced from the pattern, i. e., either a right or left last may be produced from the pattern of a right last. The other end of the block is supported by a point 33 which is revolubly and longitudinally adjustably arranged in a head 35. The head 35 is carried by the bed 3 and may be adjusted thereon and secured in adjusted position. Contacting with the pattern M is a feeler wheel or copy disc 37, (Figures 2 and 3) and acting on the block W is a rotary cutter 39 driven by an electric motor 41 by means of the flexible shaft 44. The parts of the mechanism so far described, are usual in this type of machines.

In accordance with the present invention the copying disc 37 and the cutter 39 are guided in a novel and unique manner. Movably guided on the bed 10 is a carriage 43 carrying a nut 45 engaged by a threaded spindle 47. The end of the spindle carries a stepped pulley 49 which is driven by a belt 51 and a stepped pulley 53 from the shaft 23 of the motor 9. The driver of the reducing gear 52 and the pulley 60 are loose on the shaft 23 and may be coupled thereto by the jaw coupling 55. The spindle 47 carries a second belt pulley 57 which is connected by a belt 59 with the pulley 60 on the motor shaft 23. The coupling 55 is provided at both sides with coupling teeth so that either the stepped pulley 49 for the advance of the carriage 43 or the pulley 60 for the retraction of the carriage may be coupled with the spindle 47.

Figure 7:
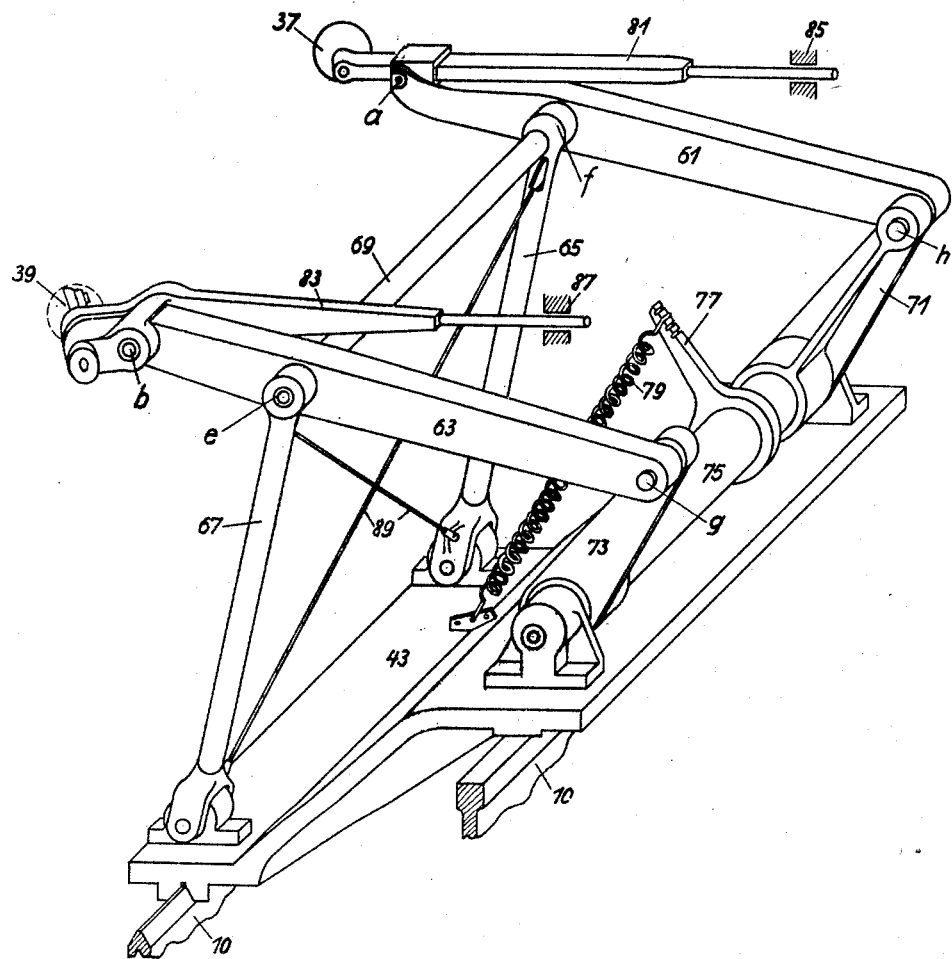

Associated with the carriage 43 is the supporting means for the copying disc 37 and the cutter head 39, the manner of connection of the parts being best shown in Figure 7.

A support 61 is provided for the copying disc 37 and a support 63 for the cutter head 39. Each of the supports is connected at a point $e$ or $f$ near the center thereof with a lever 65 or 67. The lower ends of the levers are pivoted to the carriage 43 and the supports are held together by a rod 69. The rear ends of the supports 61, 63 are connected by means of pins $g$ $h$ with oscillating arms 71, 73 pivotal about studs carried by blocks secured to the carriage 43. The hubs of the oscillatory arms 71, 73 are rigidly connected together by a tube or rod 75, carrying a lever arm 77 to which is secured one end of a retractile spring 79, the other end of which is attached to carriage 43.

Carried at the point $a$ of a suitable bar 81 is the copying disc 37, while at the point $b$ an arm 83 is rotatably connected with the support 63 in which the shaft of the knife block 39 bears. The rear ends of the bars 81, 83 travel in guides 85, 87 rigidly connected with the carriage 43. The levers 65, 67 are firmly interconnected by tensioned wires 89. The length of the parts 61, 63, 65, 67, 71, 73 and the position of the pivotal points is such, that upon oscillation of the lever system, the points $a$ and $b$ move in a path which is rectilinear in that part which is of importance in practical operation. This is clearly apparent from schematic Figure 5 in which a number of positions of the lever system are illustrated. Between the positions illustrated, the point $a$ moves in a rectilinear path $c$ $d$.

The spring 79 tends to hold the lever system in the operative position in which the copying disc is pressed against the pattern and the cutter is pressed against the work.

The width grading mechanism is connected with this lever guide arrangement in the following manner (see Figures 3 and 4). The rod 81 is connected with the support 61 by means of a sleeve 91 which is pivoted to the support 61 and in which the rod 81 is displaceable. The sleeve 91 (Figure 4) is connected by a link 93 with a two-armed lever 95 which bears at the point $i$ in a block 97 secured to the rod 81. The longer arm of the lever 95 carries at its end a roller 89 which engages the slot of a bracket 101. This bracket is pivotally connected at the point $k$ with a block 103 secured to the carriage 43. The end of the bracket is formed as a toothed segment with which meshes a gear wheel 104 carried by a shaft bearing in the carriage 43. This shaft is also provided at its end with a hand wheel 107.

The bracket 101 may be rotated about the point $k$ by means of the hand wheel 107, the two outer positions being denoted $x$—$x$ and $y$—$y$ and the intermediate position being shown in Figure 4.

If the bracket is in the intermediate position and the copying disc 37 is forced back by a high part of the pattern M, the roller 89 will move in the bracket parallel to the axis of the rod 81, and the movement of the sleeve 91 will be transmitted without change to this rod and will be imparted without change by the lever system to the cutter head so that the movement of the latter will be like the movement of the copying disc. In this case, the pattern is reproduced in its natural size. If, however, the bracket is turned into the position $x$—$x$, the like movement of the copying disc 37 causes the roller 89 to move downwards which results in an oscillation of the lever 95, whereby the sleeve 91 is drawn to the left so that the point *a* travels a greater distance than the copying disc 37. The point *b* at which the cutter head is not displaceably arranged performs the same movement as the point *a* so that the cutter head produces a piece of work which is radially enlarged as compared with the pattern M. If the bracket be placed in the position *y—y* the reverse effect is obtained and the peripheral width of the resulting piece of work is less than that of the pattern.

The length gradings i. e., the modification of the dimensions of the work in relation to the pattern in the direction of the center of rotation is effected in the usual manner. For this purpose a lever 109 (Figure 1) is utilized which is connected with the carriage 4 by means of a shaft 111 rotatable in bearing eyes. The lower end of the arm 109 carries a sleeve 113 which is adjustable longitudinally of the lever 109 and capable of being secured in such adjusted position, this sleeve being connected by means of a stud with a slide movable between guides 117 rigidly connected with the carriage 43. Connected adjustably to the upper end of the lever 109 is a sleeve 119 which is connected by means of a link 121 with a block 123 secured to the bed 3. The sleeve 119 may be adjusted in relation to the pivotal point 111 of the lever 109. Dependent upon the position of the parts 113 and 119, during the movement of the carriage 43, a movement of the carriage 4 on the bed 3 will be brought about which will be either in the same direction as the movement of the carriage or in the opposite direction. In the middle position the carriage remains stationary. In the latter case, the pattern is reproduced in its natural length in the piece of work, while by adjustment, the reproduction is either enlarged or reduced.

According to another feature of our invention a device is provided which allows the speed of the motor 9 driving the pattern and the work and operating the feed motion to be regulated automatically. When the feeler wheel encounters places on the revolving pattern which by their shape cause an undesirable vibration of the machine or which should be cut particularly carefully, the speed of rotation and the feed should preferably be reduced. At other places of the pattern it is desirable to increase the speed of the machine, when the feeler contacts with places on the pattern, which could be copied at a high speed without suffering thereby. According to our invention this object is attained by a regulation of the speed of the motor. The motor may be a stepwise regulation motor of known construction or its speed may be changed by a gradual cutting in or out resistances.

Figure 6 shows the construction adapted for the practical utilization of this principle. The motor 9 is connected with a rheostat 50 through which more or less resistance may be introduced into the motor circuit to decrease or increase its speed. The lever 125 is connected with a gear 126 with which meshes a rack 127 carrying a roller 129 spring pressed against a template 124. The template is rigidly connected with the carriage 43 and is so shaped that upon advance of the carriage 43, the rod 127 is forced back more or less whereby the gear 126 causes a revolution of the lever 125 which interposes more or less resistance dependent upon the desired motor speed and the advance of the pattern and work. The template is removable and interchangeable.

Various changes and modifications may be made without departing from the spirit of our invention and the ambit of the following claims.

We claim as our invention:—

1. In a machine for copying shoe lasts or other irregularly shaped articles, a feeler wheel and cutter head a guide link motion for moving the feeler wheel and the cutter head in a straight-line in relation to the pattern or the work, rods upon which said feeler wheel and said cutter head are mounted, said rods being guided adjacent to the pattern or work by said links and at the far end by a guide, a slotted one-armed lever, a member slidable in said lever and connected with the guide link system and the rod carrying the feeler wheel, so that by placing said slotted lever in an oblique position the relative motion of the feeler wheel rod to the guide link system may be varied as desired.

2. In a machine for copying shoe lasts and other irregularly shaped objects, means for holding a pattern, means for holding the work, a copying disc longitudinally and transversely displaceable in relation to the pattern, a cutter head associated with the copying disc and adapted to reproduce the pattern on the work, in combination with a straight line guide for the copying disc and cutter head, said guide comprising linkage means for guiding the copying disc and cutter in a straight line.

3. In a machine for copying shoe lasts and other irregularly shaped objects, means for holding a pattern, means for holding the work, a copying disc longitudinally and transversely displaceable in relation to the pattern, a cutter head associated with the copying disc and adapted to reproduce the pattern on the work, in combination with a straight-line guide for the forward end of a rod, said rod carrying either the copying disc or the cutter head, said guide comprising links for guiding the copying disc and cutter in a straight path, and a slide guide for the rear end of the rod.

4. In a machine for copying shoe lasts and other irregularly shaped objects, means for holding a pattern, means for holding the work, a copying disc longitudinally and transversely displaceable in relation to the pattern, a cutter head associated with the copying disc and adapted to reproduce the pattern on the work, in combination with a straight-line guide for the copying disc and cutter head comprising links which guide the copying disc and cutter in a straight line, an electric motor for longitudinally displacing the support for the copying disc and cutter head, switch means for the motor and means for automatically changing the rotary speed of the motor during the said displacement.

In testimony whereof we have affixed our signatures.

CARL BLACK.
CARL BENSCHEIDT, Jr.